United States Patent Office 2,758,089
Patented Aug. 7, 1956

2,758,089
LUBRICANTS

Melvern C. Hoff and Roger W. Watson, Highland, Ind., and Ellis K. Fields, Chicago, Ill., assignors to Standard Oil Company, Chicago, Ill., a corporation of Indiana No Drawing. Application December 30, 1952,
Serial No. 328,821

14 Claims. (Cl. 252—46.4)

The present invention is directed to novel heavy metal derivatives of phosphorus sulfide-hydrocarbon reaction products and to their use as lubricant additives. More particularly it concerns molybdenum or vanadium-containing derivatives of such reaction products and to lubricants containing same.

It has heretofore been discovered that certain reaction products of a phosphorus sulfide and a hydrocarbon, particularly a hydrocarbon such as an olefin or olefin polymer, when added to lubricants such as a hydrocarbon oil, in small amounts, are effective in inhibiting the formation of varnish, sludge, carbon and the like during the use of such lubricants. The preparation of such reaction products is described in U. S. 2,315,529 granted to Charles D. Kelso and in U. S. 2,316,078 granted to Clarence M. Loane and James W. Gaynor which issued on April 6, 1943. It has now been found that certain novel heavy metal derivatives of such products are valuable additives for use in extreme pressure lubricants.

It is an object of the present invention to provide novel extreme pressure additives for lubricating oils and a method of preparing same. A particular object of this invention is to provide novel molybdenum and vanadium derivatives of phosphorus sulfide-hydrocarbon reaction products having particular utility as extreme pressure additives in lubricating oils. A further object is to provide novel metal derivatives of certain phosphorus and sulfur-containing organic compounds which have extreme pressure properties as well as detergent and sludge-inhibiting properties. Other objects and advantages of the present invention will become apparent from the following description thereof.

It has been discovered that phosphorus sulfide-hydrocarbon reaction products may be reacted with hydrogen peroxide and a compound of molybdenum or vanadium which affords an oxide of the respective metal under reaction conditions. Thus, the oxides or sulfides of molybdenum or vanadium, the salts of molybdic or vanadic acids with various weak bases, etc. afford oxides of the respective metals under reaction conditions. Without being bound by any theory herein expressed or implied, it is believed that the oxides in the reaction mixture ultimately react in the form of molybdic or vanadic acids. The oxides, particularly the trioxides, of molybdenum and vanadium are preferred for use in accordance herewith. The novel compositions produced have been found to be particularly useful as extreme pressure additives in lubricants. It is preferred to employ reaction products of a phosphorus sulfide with olefin polymers, preferably butylene-isobutylene polymers of the type hereinafter described. As will be apparent, however, reaction products of phosphorus sulfide with various other hydrocarbons may also be employed. The reaction of the phosphorus sulfide-hydrocarbon reaction product with a metal compound and hydrogen peroxide occurs readily at temperatures in the range of from about 25° to about 200° F. and preferably from about 70 to 130° F. A reaction time of from about 2 to 14 hours and preferably from about 4 to 10 hours has been found to be particularly desidable. Quantities of the various reactants may vary over a relatively wide range; these will be referred to in detail in the ensuing description of the invention. The exact nature of the products obtained in accordance with such a reaction is not fully understood. It is believed, however, that the products are very stable complexes.

Phosphorus sulfide-hydrocarbon reaction products of the type which may be employed in accordance herewith may be readily obtained by reacting a phosphorus sulfide with a hydrocarbon at a temperature of from about 200° F. to about 600° F., and preferably from about 250° F. to 500° F., using from about 1% to about 50%, and preferably from about 5% to about 25%, by weight, of the phosphorus sulfide in the reaction. It is advantageous to maintain a non-oxidizing atmosphere, such as for example, an atmosphere of nitrogen above the reaction mixture. Usually, it is preferable to use an amount of the phosphorus sulfide that will completely react with the hydrocarbon so that no further purification becomes necessary; however, an excess of phosphorus sulfide can be used and separated from the product by filtration or by dilution with a solvent such as hexane, filtering and subsequently removing the solvent by suitable means, such as by distillation. The phosphorus sulfide-hydrocarbon reaction products contain both sulfur and phosphorus. The reaction product may be further treated by blowing with steam or nitrogen at an elevated temperature of from about 200° F. to about 600° F. to improve the odor. This steaming is effective to hydrolyze the products and such hydrolyzed products are particularly suitable for use in accordance herewith. The reaction may, if desired, be carried out in the presence of an additional sulfurizing agent or the phosphorus sulfide-hydrocarbon reaction product can be sulfurized, as described in U. S. 2,316,087 issued April 6, 1943, to James W. Gaynor and Clarence M. Loane.

The hydrocarbon constituent of this reaction is preferably a mono-olefin hydrocarbon polymer resulting from the polymerization of low molecular weight mono-olefinic hydrocarbons or isomono-olefinic hydrocarbons, such as propylene, butylenes, and amylenes, or the copolymers obtained by the polymerization of hydrocarbon mixtures containing isomono-olefins and mono-olefins of less than six carbon atoms. The polymers may be obtained by the polymerization of these olefins or mixtures of olefins in the presence of a catalyst, such as sulfuric acid, phosphoric acid, boron fluoride, aluminum chloride or other similar halide catalysts of the Friedel-Crafts type.

The polymers employed are preferably mono-olefin polymers or mixtures of mono-olefin polymers and isomono-olefin polymers having molecular weight ranging from about 150 to about 50,000 or more, and preferably from about 300 to about 10,000. Such polymers can be obtained, for example, by the polymerization in the liquid phase of a hydrocarbon mixture containing mono-olefins and iso-mono-olefins such as butylene and isobutylene at a temperature of from about −80° F. to about 100° F. in the presence of a metal halide catalyst of the Friedel-Crafts type such as, for example, boron fluoride, aluminum chloride, and the like. In the preparation of these polymers we may employ, for example, a hydrocarbon mixture containing isobutylene, butylenes and butanes recovered from petroleum gases, especially those gases produced in the cracking of petroleum oils in the manufacture of gasoline. U. S. 2,407,873 to Evering et al. describes a particularly suitable technique for polymerizing such olefins in the presence of an aluminum-chloride-hydrocarbon complex catalyst.

Essentially paraffinic hydrocarbons such as bright stock residuums, lubricating oil distillates, petrolatums or paraffin waxes may be used. The condensation products of any of the foregoing hydrocarbons or their halogen derivatives, with aromatic hydrocarbons can also be employed.

Examples of high molecular weight olefinic hydrocarbons which can be employed as reactants are cetene ($C_{16}$), cerotene ($C_{26}$), melene ($C_{30}$), and mixed high molecular weight alkenes obtained by cracking petroleum oils. Other olefins suitable for the preparation of the herein described phosphorus sulfide reaction products are olefins having at least 20 carbon atoms in the molecule of which from about 12 carbon atoms to about 18 carbon atoms, and preferably at least 15 carbon atoms, are in a long chain. Such olefins can be obtained by the dehydrogenation of paraffins, such as by the cracking of paraffin waxes, or by the dehalogenation of alkyl halides, preferably long chain alkyl halides, particularly halogenated paraffin waxes.

Also contemplated within the scope of the present invention are the reaction products of a phosphorus sulfide with aromatic hydrocarbons such as benzene, naphthalene, anthracene, toluene, diphenyl, etc. and alkylated aromatic hydrocarbon such as, for example, an alkyl benzene characterized by having at least one alkyl group of at least four carbon atoms, and preferably at least eight carbon atoms such as a long chain paraffin wax.

The phosphorus sulfide reactant can be any phosphorus sulfide, such as for example $P_2S_3$, $P_4S_3$, $P_4S_7$, and preferably $P_2S_5$.

The metallic compounds preferably employed in accordance herewith are those affording oxides of molybdenum or vanadium under reaction conditions. Such compounds include the oxides and sulfides of molybdenum and vanadium and the salts of molybdic or vanadic acid with weak bases, etc. For purposes of the present invention, a weak base shall be defined as one having a dissociation constant of about $1 \times 10^{-3}$ or lower. Examples of such bases particularly suitable for forming salts with molybdic or vanadic acids are ammonium hydroxide, triethylammonium hydroxide, etc. Of the oxides of molybdenum, molybdenum trioxide is preferably employed although other oxides of molybdenum such as molybdenum dioxide and molybdenum sesquioxide, may also be employed. Similarly, the various oxides of vanadium are suitable, the trioxide, however, being preferred in each instance. The amount of metal compound which may be combined with the phosphorus sulfide-hydrocarbon reaction product varies with the particular reaction product employed as well as the quantity of $H_2O_2$ present as will hereinafter be referred to. Thus, the ratio, on a weight basis, of metal compound to phosphorus sulfide-hydrocarbon reaction product may be from about 1:1 to about 1:40 and preferably from about 1:3 to about 1:20.

Hydrogen peroxide is preferably employed in an aqueous solution in accordance herewith. Thus, it has been found most satisfactory to employ a solution of hydrogen peroxide containing from about 5% to about 90% hydrogen peroxide and preferably from about 15 to about 50%. The amount of peroxide employed, calculated as 100% hydrogen peroxide, may vary from about 1 part hydrogen peroxide to 20 parts metal compound, to about 4 parts hydrogen peroxide to 1 part metal compound and preferably is from about .2 to about 2 parts of peroxide per part of metal compound.

A solvent may be employed as a reaction medium although such is not essential. One is particularly desirable when very viscous phosphorus sulfide-hydrocarbon reaction products are employed. Solvents such as light paraffin, e. g. hexane, etc. or aromatics such as benzene are suitable for this purpose.

For purposes of illustrating the present invention, the following specific examples are set forth. In these examples, unless otherwise specified, quantities of reactants, etc. are given in parts by weight.

*Example 1*

A mixture comprising 85% of an isobutylene polymer, having a mean molecular weight of about 780, a viscosity of 1010 S. S. U. at 210° F., a specific gravity of .881 and obtained by polymerizing a mixture of $C_4$ olefins and paraffins, as hereinbefore described, and 15% of $P_2S_5$ was reacted for six hours at 400° F. and the resulting product was thereafter hydrolyzed in the presence of steam at 400° F.; after claying the hydrolyzed product and diluting with oil, a final material was obtained which had a concentration of phosphorus and sulfur-containing compound of 60%. 332 parts of this phosphorus sulfide-hydrocarbon reaction product, 175 parts of benzene and 19 parts of molybdenum trioxide were then vigorously agitated while 72 parts of hydrogen peroxide (30% aqueous solution) were added dropwise over a two-hour period. The reaction was exothermic, the temperature rising in the range from about 110° to about 125° F. and resulted in a yellow mixture. This mixture was then refluxed for two hours and water was removed. During the course of refluxing, the product became dark blue in color. Substantially all of the molybdenum oxide dissolved, after which a blue benzene solution was decanted from the trace of unreacted molybdenum oxide and the benzene was stripped off in the vacuum at 200° F. The resulting product comprised 350 parts of a dark blue viscous product which was found to be entirely oil soluble. It analyzed 4.86% molybdenum, and 1.87% phosphorus. A sample of this product in 1% concentration was employed in a lubricating oil and tested on the Almen extreme pressure lubricant testing machine. A load of 18 pounds was carried whereas the lubricating oil without such an additive failed at 8 pounds.

*Example 2*

1100 parts of polymer resulting from the polymerization of a mixture of butylenes having a mean molecular weight of 330 and a specific gravity of .831, and 330 parts of $P_2S_5$ were reacted at 400 to 420° F. for 4 hours following which the product was steamed at 300° F. for 4 hours, then dried. A mixture of 109 parts of this product and 22.5 parts of vanadium trioxide was stirred. To this mixture were added 10.9 parts of hydrogen peroxide (30% aqueous solution) dropwise. Considerable heat was evolved and the mixture turned green. Hexane was added, the mixture was centrifuged, and the clear liquid decanted and evaporated in vacuo to give 105 parts of a dark green, viscous, oil-soluble product analyzing 3.09% vanadium and 5.13% phosphorus.

*Example 3*

A mixture of 50 parts $P_2S_5$-polybutylene reaction product prepared as in Example 2, 16 parts molybdenum sulfide and 75 cc. benzene was stirred while 6.8 parts of a 30% aqueous hydrogen peroxide were added dropwise. The mixture turned yellow and became hot. Stirring was continued for 4 hours, 200 cc. hexane was added, the hexane solution filtered and evaporated on the steam bath, giving 51 parts viscous dark green oil-soluble product analyzing 0.84% molybdenum and 2.27% phosphorus.

*Example 4*

850 parts of polymer from polymerization of a butylene mixture and having a mean molecular weight of 250, and 150 parts $P_2S_5$ was reacted at 400° F. for 4 hours, then steamed at 300° F. for 4 hours, and dried by blowing with nitrogen at 300° F. for 1 hour. A mixture of 50 parts of this product, 10.5 parts ammonium molybdate (($NH_4$)$_6Mo_7O_{24} \cdot 4H_2O$), and 50 cc. benzene was stirred while 6.8 parts of 30% hydrogen peroxide were added dropwise. The mixture became warm and yellow. It was stirred for 4 hours, then evaporated on the steam bath. The residue was taken up in 250 cc. hexane, the hexane solution filtered and evaporated on the steam bath, giving 52 parts viscous, intensely-blue oil-soluble product analyzing 3.74% molybdenum and 2.45% phosphorus.

*Example 5*

A mixture of 36.5 parts $P_2S_5$-polyisobutylene product of Example 2, 14.4 parts molybdenum trioxide and 35 cc. benzene were stirred while 4.4 parts of 30% hydrogen peroxide were added dropwise. The mixture became warm and yellow. 100 cc. of hexane were added, the mixture was centrifuged and the clear decanted hexane layer evaporated up to 280° F. The residue, 38.5 parts, was a viscous deep blue oil-soluble liquid analyzing 8.84% molybdenum and 3.47% phosphorus.

It has been found that larger amounts of molybdenum and vanadium may be combined with polymers having relatively low molecular weights. Thus, with isobutylene polymers having mean molecular weights in the range of from about 300 to about 500, it has been found that substantially more molybdenum oxide will combine therewith, and consequently greater amounts of molybdenum may be incorporated in the product, than with polymers having higher molecular weight, e. g. of about 1000. The variation in the amount of metal incorporated, however, is both slight and very gradual as the molecular weight increases or decreases. In accordance herewith, when referring to "unneutralized phosphorus sulfide-hydrocarbon reaction products," either in the specification or appended claims, it shall mean such phosphorus sulfide-hydrocarbon reaction products as described herein which have not had as much as 1% of their titratable acidity neutralized by reaction with a basic reagent.

The compositions of the present invention may be added to mineral lubricating oils in general for the purpose of improving the extreme pressure properties thereof. An amount of such additive of from about .05% to about 15%, and preferably from about .2% to about 5% should be employed for most satisfactory results.

Having thus described our invention, what we claim as novel and desire to protect by Letters Patent is as follows:

1. A composition consisting essentially of the product resulting from the reaction of (1) hydrogen peroxide, (2) a compound selected from the group consisting of molybdenum and vanadium compounds capable of affording an oxide of the respective metal under reaction conditions, and (3) an unneutralized phosphorus sulfide-hydrocarbon reaction product at a temperature in the range of from about 25° to about 200° F.; said three components of the reaction being contacted in the following approximate proportions based upon one part of component (2), 1 to 40 parts of component (3), and 0.05 to 4 parts of component (1).

2. A composition consisting essentially of the product resulting from the reaction of (1) a compound selected from the group consisting of the oxides and sulfides of molybdenum and vanadium and the salts of molybdic and vanadic acids with weak bases having a dissociation constant no greater than about $1 \times 10^{-3}$, which compound is capable of affording an oxide of the respective metal under reaction conditions, (2) an unneutralized phosphorus sulfide-hydrocarbon reaction product, and (3) hydrogen peroxide at a temperature in the range of from about 25° to about 200° F.; said three components of the reaction being contacted in the following approximate proportions based upon one part of component (1), 1 to 40 parts of component (2), and 0.05 to 4 parts of component (3).

3. The composition of claim 2 wherein the unneutralized phosphorus sulfide-hydrocarbon reaction product was prepared by reacting $P_2S_5$ with a copolymer of butylene and isobutylene.

4. A composition consisting essentially of the product resulting from the reaction of a molybdenum oxide, an unneutralized phosphorus sulfide-hydrocarbon reaction product, and hydrogen peroxide at a temperature in the range of from about 25° to about 200° F., said three components of the reaction being contacted in the following approximate proportions based upon one part of the molybdenum compound: 1 to 40 parts of the unneutralized phosphorus sulfide-hydrocarbon reaction product and 0.05 to 4 parts of hydrogen peroxide.

5. A composition consisting essentially of the product resulting from the reaction of a molybdenum sulfide, an unneutralized phosphorus sulfide-hydrocarbon reaction product, and hydrogen peroxide at a temperature in the range of from about 25° to about 200° F., said three components of the reaction being contacted in the following approximate proportions based upon one part of the molybdenum compounds: 1 to 40 parts of the unneutralized phosphorus sulfide-hydrocarbon reaction product and 0.05 to 4 parts of hydrogen peroxide.

6. A composition consisting essentially of the product resulting from the reaction of a salt of molybdic acid with a weak base having a dissociation constant no greater than about $1 \times 10^{-3}$, which compound is capable of affording an oxide of the respective metal under reaction conditions, an unneutralized phosphorus sulfide-hydrocarbon reaction product, and hydrogen peroxide at a temperature in the range of from about 25° to about 200° F., said three components of the reaction being contacted in the following approximate proportions based upon one part of the molybdenum compound: 1 to 40 parts of the unneutralized phosphorus sulfide-hydrocarbon reaction product and 0.05 to 4 parts of hydrogen peroxide.

7. A composition consisting essentially of the product resulting from the reaction of a vanadium sulfide, an unneutralized phosphorus sulfide-hydrocarbon reaction product, and hydrogen peroxide at a temperature in the range of from about 25° to about 200° F., said three components of the reaction being contacted in the following approximate proportions based upon one part of the vanadium compound: 1 to 40 parts of the unneutralized phosphorus sulfide-hydrocarbon reaction product and 0.05 to 4 parts of hydrogen peroxide.

8. A composition consisting essentially of the product resulting from the reaction of a vanadium oxide, an unneutralized phosphorus sulfide-hydrocarbon reaction product, and hydrogen peroxide at a temperature in the range of from about 25° to about 200° F., said three components of the reaction being contacted in the following approximate proportions based upon one part of the vanadium compound: 1 to 40 parts of the unneutralized phosphorus sulfide-hydrocarbon reaction product and 0.05 to 4 parts of hydrogen peroxide.

9. A composition consisting essentially of the product resulting from the reaction of a salt of vanadic acid with a weak base having a dissociation constant no greater than about $1 \times 10^{-3}$, which compound is capable of affording an oxide of the respective metal under reaction conditions, an unneutralized phosphorus sulfide-hydrocarbon reaction product, and hydrogen peroxide at a temperature in the range of from about 25° to about 200° F., said three components of the reaction being contacted in the following approximate proportions based upon one part of the vanadium compound: 1 to 40 parts of the unneutralized phosphorus sulfide-hydrocarbon reaction product and 0.05 to 4 parts of hydrogen peroxide.

10. A lubricant comprising a mineral lubricating oil and from about 0.05% to about 15% of the composition of claim 1.

11. A lubricant comprising a mineral lubricating oil and from about 0.05% to about 15% of the composition of claim 2.

12. A lubricant comprising a mineral lubricating oil and from about 0.05% to about 15% of the composition of claim 4.

13. A lubricant comprising a mineral lubricating oil and from about 0.05% to about 15% of the composition of claim 6.

14. A lubricant comprising a mineral lubricating oil and from about 0.05% to about 15% of the composition of claim 9.

No references cited.